B. Irving,
Leaching Apparatus,
Nº 85,173. Patented Dec. 22, 1868.
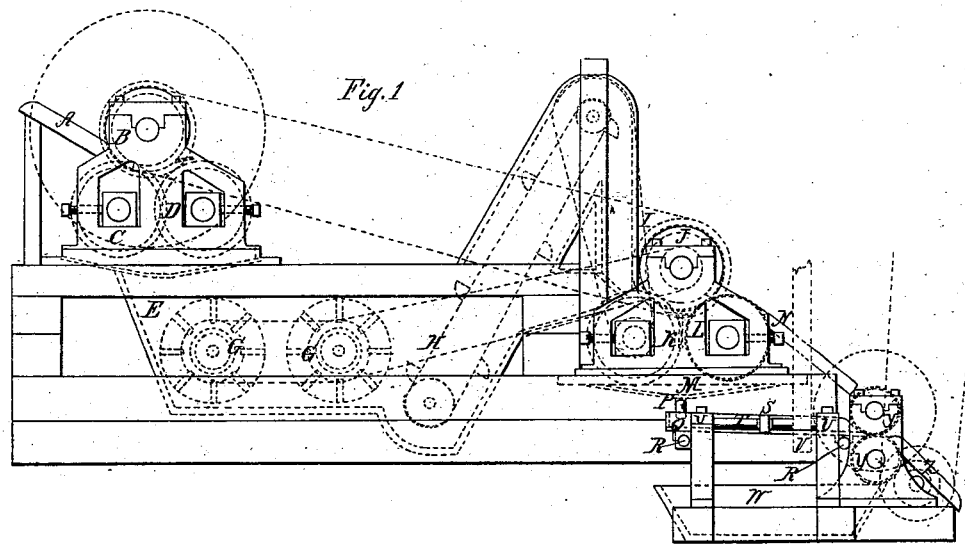
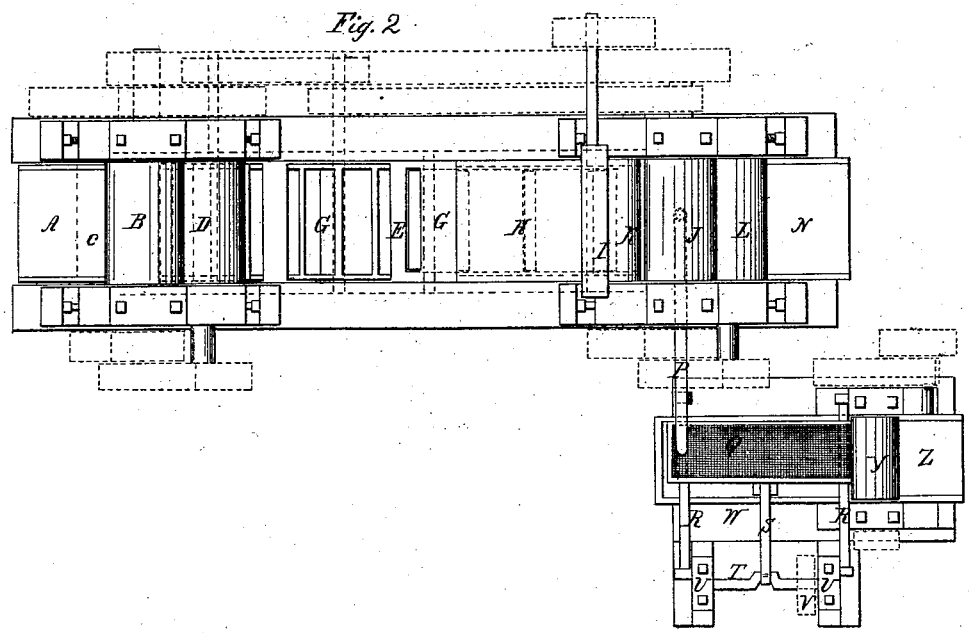
Witnesses
Inventor
Benjamin Irving

United States Patent Office.

BENJAMIN IRVING, OF NEW YORK, ASSIGNOR TO H. A. TAYLOR, OF MALONE, NEW YORK.

Letters Patent No. 85,173, dated December 22, 1868.

IMPROVEMENT IN APPARATUS FOR OBTAINING EXTRACTS FROM BARK FOR TANNING, &c.

The Schedule referred to in these Letters Patent and making part of the same.

*To all whom it may concern:*

Be it known that I, BENJAMIN IRVING, of the city, county, and State of New York, have invented certain new and useful Improvements in the Method or Process of Obtaining the Extract of Hemlock or other Barks for Tanning and other purposes; and I do hereby declare that the following is a full description of the same, reference being had to the accompanying drawings, forming a part of this specification, as illustrative of the apparatus upon which the said new method or process is conducted, and which said apparatus, in part, is shown in my application for a patent filed February 21, 1868, and in my patent of 30th April, 1867, and certain new parts additional thereto, not used in connection with the said inventions, at the time of patenting the same.

The same letters of reference, wherever they occur, refer to like parts.

Figure 1 is a side elevation of the apparatus, the red lines representing the gear-wheels, and the blue lines, the pulleys and belting.

Figure 2 is a plan view of the same.

My new method or process of treating bark, to obtain the liquid extract therefrom for tanning and other purposes, is conducted substantially as follows, to wit:

The slabs of bark are first soaked in a vat or tub of water—warm water is preferred, but cold water will answer the same purpose, though requiring more time. When thus soaked they are placed on the table A, and fed in between the rollers B and C, where the water is expressed from it by the crushing and grinding-action of the two rollers, in consequence of their difference of speed. The fibrous mass of bark is then rolled forward and down between the rollers C and D, where it is again crushed, and ground up to a pulp, as it were, and then dropped or discharged into a water-bath, F, of warm water, composed principally of the water expressed from the bark while passing between the series of rollers B, C, and D.

By this operation it will be apparent that the fibrous structure of the bark is completely destroyed, and every particle of it exposed to the solvent action of the water, to enable it to absorb or take up its astringent properties with great rapidity.

In all previous operations to obtain the liquid extract of tannin from bark, it has been chipped up only, and then leached. The consequence was that the chip of bark always retained a large percentage of the tannic acid, and thus made a great loss in the product from a cord of bark.

In my invention of the 30th April, 1867, I compressed the bark between heated rollers, and, in going through the three rollers, passed the bark through a trough of water. Experience has developed the fact that heated rollers are not necessary, but that the fibre of the bark must be ground to a pulpy mass. Therefore, to accomplish this result, a differential motion is given to the rollers, that is, the roller C is geared so as to rotate slower than the impinging rollers B and D, and thus the bark receives two crushing and grinding-operations, to reduce it to a pulpy mass before it is discharged into the water-bath. It is, therefore, like tinder for dryness when it falls into the water-bath. As this water is kept quite warm by any suitable arrangement of steam-pipes, it will be obvious that it instantly takes up or absorbs the tannic acid contained in the fibrous matter. It is then, by means of paddle-wheels G, thoroughly agitated and carried back to an elevator, H, upon the buckets of which it is thrown, and thus carried up out of the bath, and discharged into a hopper, I, leading into and between a series of rollers, J, K, and L.

In passing through these rollers, the liquor or tannic acid is expressed from the fibrous mass, and is collected in a receiver, M, arranged across the machine, immediately under the rollers, while the waste fibrous mass is discharged upon a trough or gutter, N, to be disposed of, as may be desired, for other purposes.

The liquor thus collected in the receiver M is a saturated solution of tannic acid, and a mass of muddy flocculent matter, held in mechanical solution and from precipitation by the increased specific gravity of the tannic-acid solution, and thus prevents a clear solution of the liquid tannic acid being obtained.

To overcome this difficulty, and separate the muddy flocculent matter from the liquor, it is discharged from the receiver M, as fast as collected, by a pipe, P, upon a fine wire-gauze sieve, Q, arranged horizontally alongside of the frame of the crushing-rollers, and having a slightly downward inclination.

This sieve is supported upon two transverse rods, R, so as to admit of its being vibrated by means of a connecting-rod, S, connecting it with a rotating crank-shaft, T, supported in suitable bearings U, and propelled by a belt and pulley, V, connecting with any suitable part of the driving-power of the machine.

By this operation the muddy flocculent matter is separated from the tannic-acid solution, which passes through the meshes in the sieve during the agitating downward progress of the muddy flocculent matter, and is collected in a receiver, W, underneath the sieve, while the refuse matter is discharged between a pair of compressing-rollers, Y, to express any surplus liquor contained in it before discharging it from the machine, by way of the trough Z. As the compressing-rollers Y are arranged at the end of the sieve, and over the receiver W, all the liquor is collected therein, and a clear and limpid saturated solution of tannic-acid liquor is thus obtained, and the extractive matter of a cord of hemlock bark obtained in an hour's time, where, by the old process of chipping the bark and leaching in the tanneries, it required days to do the same work.

Having now described my improved method or process of treating bark, for obtaining the liquid extract thereof, for tanning and other purposes, I will proceed to set forth what I claim, and desire to secure by Letters Patent of the United States.

I claim the method or process of treating soaked slabs of bark, for obtaining the liquid extracts thereof, for tanning and other purposes, substantially as hereinbefore described.

BENJAMIN IRVING.

Witnesses:
CHARLES L. BARRITT,
FRANKLIN BARRITT.